United States Patent Office 2,781,410
Patented Feb. 12, 1957

2,781,410

POLYMERIZATION OF ETHYLENE IN THE PRESENCE OF AN ALUMINUM TRIALKYL CATALYST

Karl Ziegler and Gunther Wilke, Mulheim an der Ruhr, and Erhard Holzkamp, Dusseldorf-Benrath, Germany; said Wilke and said Holzkamp assignors to said Ziegler No Drawing. Application March 10, 1954,
Serial No. 415,446

Claims priority, application Germany April 4, 1953

27 Claims. (Cl. 260—683.15)

The invention relates to the polymerization of ethylene to form butene, hexene and higher liquid or solid paraffin-like polymers. Mixtures of different polymers can also be produced. Olefins with carbon contents up to about $C_{30}$ and with melting points up to about 100° C. can be obtained as solid polymers.

In German Patent 878,560 processes are described for the catalytic polymerization of olefins, particularly also of ethylene. Trialkyls of aluminum, that is compounds having the formula

wherein $R_1$, $R_2$ and $R_3$ may represent similar or different alkyls, are mentioned as catalysts. According to the conditions of research, entirely different polymerization products can be produced from ethylene.

The individual reactions which take place in this process are known from two pulications by K. Ziegler ("Brennstoff Chemie," vol. 33, page 193 (1952) and Zeitschrift für angewandte Chemie," 64, pages 323–329 (1952)). According thereto the following picture can be obtained in the case of ethylene:

Ethylene and aluminum alkyl unite to form higher alkyls of aluminum, for example $$Al(C_2H_5)_3 + 3nC_2H_4 = Al(C_2H_4)_{3n}(C_2H_5)_3 \quad (1)$$

hereinafter and in the claims, $n$, $x$, $y$, and $z$ designate whole numbers. This reaction can be designated as "addition" or "growth" reaction.

If $n$ is a high figure, the formation of such an aluminum compound becomes part of the polymerization of the ethylene introduced, because the fraction of the metal compound (for example $Al(C_2H_5)_3$) becomes firmly bonded in the reaction product and is insignificant as compared with the quantity of the polymerized ethylene. If $n$ is a low figure, the character of the reaction product becomes more apparent as a higher alkyl of aluminum and it is then a question of a formation in accordance with stoichiometric laws, of, for example, aluminum butyl, hexyl, octyl and so forth from aluminum ethyl. Such processes, which are not decided polymerization processes, form the subject matter of German Patent No. 917,006.

The higher aluminum alkyls resulting from the Formula 1 split up into olefin and aluminium hydride

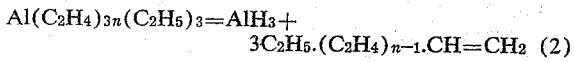

aluminum hydride added to fresh ethylene becomes aluminum triethyl $$AlH_3 + 3C_2H_4 = Al(C_2H_5)_3 \quad (3)$$

and in continued repetition of the cycle of reactions according to Formulae 1, 2 and 3, ethylene is polymerized by aluminum ethyl in a really "genuine" catalytic process to form higher olefins, that is, according to the actual conditions, butene, hexene, octene and so forth or mixtures of these olefins. This type of change of the ethylene under the action of aluminum trialkyls will be hereinafter referred to as "genuine catalysis." The Equations or Formulae 2 and 3 can be combined in the following Formula 4:

This combined reaction can be designated as a displacement reaction, because the olefin produced on the aluminum by addition is displaced by the ethylene. In this manner the genuine catalysis can also be explained by the combination of addition and displacement reaction.

According to all experiences hitherto obtained, the "additions" were promoted at low temperatures and the "genuine catalysis" at high temperatures, the low temperatures being within the range from 60 and 120° C. and the high range between 120 and 250° C. The limits were, however, elastic. The explanation for the difference in the results obtained at low and high temperatures were very simple. The splitting up processes according to (2) were obviously promoted at high temperatures and to a great extent did not take place at low temperatures.

Now the remarkable observation was made that the range of temperature of the "genuine catalysis" can be extended very considerably in downward direction, if to the main catalysts aluminum trialkyl, nickel, cobalt or platinum is added as an activator, the quantity required being often only very small. Moreover, far below 100° C., say at 50° C. (and obviously also above 100° C.) it is easily possible to produce from triethyl aluminum and ethylene practically exclusively α-butylene or its higher homologues, the triethyl aluminum being again recovered at the end of the process in practically the quantity originally introduced and can be used again immediately. In the case of 100 to 120° C. and ethylene at about 10 to 100 atm. pressure, the speed of this catalytic polymerization is, under these circumstances, very high and very pure straight chain α-olefinic ethylene homologues are obtained. This constitutes a great advantage of the new process over the original way of working without activator at much higher temperatures, because the α-olefins from about 150° C. upwards change into dimers with linkage chain and consequently the production of pure straight chain ethylene homologues was not very easy.

Also at temperatures above 150° C., that is in the temperature range within which, according to German Patent No. 878,560 and corresponding Belgian Patent No. 504,161, a preponderance of pure catalytic polymerization is to be observed also with pure aluminum alkyls, the addition of activators results in an improvement of the process because the contact times between the ethylene and the catalyst can be reduced considerably as compared with the original processes. This means a higher space-time-yield and a smoother cycle of reaction.

In carrying out the invention the finely divided metals with a strongly active service are added to the reaction mixture. The greatest efficiencies can be obtained if the metals are used in colloidal state. Such colloidal metals are particularly simple to produce in the aluminum trialkyl main catalysts by mixing aluminum trialkyl with such metal salts which are themselves reduced to the metals by the aluminum trialkyl.

If comparative experiments are conducted in which aluminum triethyl is allowed to react with ethylene under a pressure at 100° C., on the one hand without any metal addition and on the other hand with the metals indicated in finely divided state, it will always be found that where metals are present in the reaction products quantities of olefins are produced which are considerably higher than the quantities of olefins obtained with aluminum trialkyls and ethylene in the absence of metals. When metals are excluded as far as possible, the products of reaction between aluminum trialkyls and ethylene, in accordance with the literature referenced mentioned above, are practically only higher aluminum trialkyls which, at the most, contain very small quantities of olefins. In the presence of finely subdivided metals the percentage of olefins increases regularly, and if by a suitably fine dispersion the metal action is increased sufficiently the olefins are the exclusive products of reaction.

In the process according to the invention two stages can be run simultaneously. The one is analogous to the addition or growth reaction set forth under (1) for aluminum triethyl and takes place according to the following formula:

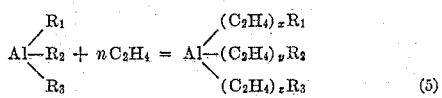

(5)

wherein $x+y+z=n$. From the aluminum alkyls thus formed, the residues $—(C_2H_4)_xR_1$, $—(C_2H_4)_yR_2$ and $$—(C_2H_4)_zR_3$$

which are now bound, can be displaced by ethylene according to the following reaction which corresponds to the Formula 4:

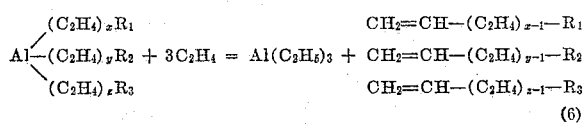

(6)

The action of the activators, according to their strength and their quantity, influence the reaction in various ways. If the activators are used in highly active form, that is are particularly finely comminuted, and in relatively large quantities, the displacement reaction is promoted. Even very small quantities, for example fractions of a tenth of a percent of colloidal nickel, cobalt or platinum will suffice to accelerate the displacement sufficiently. A particularly active metal is nickel. If a small quantity of a nickel salt is added to an aluminum trialkyl, say aluminum triethyl, the nickel salt is immediately reduced. A fraction of the nickel precipitates out and another fraction remains colloidally in solution with a brown color. If the nickel precipitated in solid form is separated for example by centrifuging, the remaining brownish aluminum ethyl containing nickel is a catalyst which converts ethylene almost quantatively into butene according to the following formulae, at all temperatures at which butene itself is stable against aluminum trialkyls, that is up to about 120° C:

$$Al(C_2H_5)_3+3C_2H_4=Al(C_2H_4)_3.(C_2H_5)_3 \quad (7)$$
$$Al(C_2H_4)_3.(C_2H_5)_3+3C_2H_4=$$
$$Al(C_2H_5)_3+3C_2H_5.CH=CH_2 \quad (8)$$

Even at temperatures higher than 120° it is possible to produce chiefly butene with this catalyst if care is taken to keep the period of reaction as short as possible and to remove the butene from the catalyst as quickly as possible. In the case of longer reaction periods and particularly in the case of batch working in closed vessels, a secondary change of the butene, i. e., its conversion into a dimer may take place under certain circumstances.

If even smaller quantities of activator are used or the activator is used in less active form, the growth reaction is given more time. It will then no longer involve principally the splitting off of a chain of four carbon atoms (butene) after the growth stage but such splitting will substantially occur, at least to some extent, after chains have formed with 6, 8 or more atoms. This depends upon the relation between speed of growth and of displacement. If, for example, such a slight trace of a nickel salt is added to the aluminum triethyl that the color of the aluminum triethyl has just a weak yellowish tinge, the ethylene at temperatures of about 100° C. will be completely polymerized but under these circumstances a mixture is formed composed of butene, hexene, octene and higher olefins. However, no appreciable quantities of the higher aluminum trialkyls will be built up. The effectiveness of the nickel can likewise be similarly influenced if the nickel is added, not in colloidal form, but as Raney nickel for example.

Thus there are many possibilities of influencing the average molecular size of the ethylene polymers formed. The most effective activators always produce only butene, the less active higher α-olefins and it is thus possible by the process according to the invention to control by the polymerization of the ethylene to as great an extent as desired.

The most useful aluminum alkyl main catalyst is aluminum triethyl. However it is by no means necessary to use this aluminum compound as the main catalyst. Any other aluminum trialkyl which changes into aluminum triethyl in the reaction mixture as soon as the experiment commences can be used with equal success. If, for example, a catalyst of aluminum tripropyl activated by colloidal nickel is used, on coming into contact with ethylene at 60 to 120° C. a mixture of propylene and butene is formed as product of reaction and some pentene also forms. If these products of reaction are then removed and the catalyst is again brought into contact with ethylene it only produces polymer ethylenes and in the case of sufficient activation predominantly butylene.

*Examples*

1. First dry Raney nickel corresponding to 1.2 grams of nickel by repeated suspension in methanol and subsequently decanting and repeating this operation several times with ether and then pentane. Then dry in a vacuum at 90° C. allowing nitrogen to flow into the apparatus and mix with 20 cc. of aluminum triethyl. This suspension of Raney nickel in aluminum triethyl was then introduced into a 200 cc. autoclave made of refined steel and heated with 40 grams of ethylene to 100° C. After the lapse of a few hours the pressure dropped from initially 150 atms. to 36 atms. The subsequent recovery produced 2.5 grams of unchanged ethylene, 6 grams butene and 8 grams of hexene-octene mixture. From the remaining aluminum triethyl 20 grams of a mixture of higher olefins could be recovered which by subsequent fine distillation in a good efficient rotary band tower was divided into decene, dodecene and a residue of olefins.

2. 5 cc. of aluminum triethyl were mixed with 300 mgs. of dry and sublimated nickel acetylacetone. The mixture became warm, assumed a deep brown color and developed little gas. The solution was allowed to stand for some time, then 3 cc. were poured off under nitrogen and mixed with 17 cc. of aluminum triethyl. This catalyst produced in the manner repeatedly described 28 grams of butene from 32 grams of ethylene. Instead of nickel acetylacetone, water-free nickel chloride or any other nickel salt can also be used.

The activity of the activated aluminum trialkyl catalysts drops fairly quickly in continuous experiment. This is shown by the example of the dimerization of ethylene by the following series of experiments:

3. Into a 200 cc. autoclave filled with nitrogen first a mixture of 100 mgs. nickel acetylacetonate and 10 cc. aluminum triethyl was introduced and 50 grams of ethylene forced therein. The autoclave was heated to 105° C. for a period of 5 hours, then allowed to cool and the gaseous components then present were expanded. First of all 18.5 grams of ethylene were recovered, that is altogether 63% of the 50 grams of ethylene introduced had been converted. In addition 29.4 grams of α-butene was obtained which corresponded to a yield of 93% of the total quantity of converted ethylene. After draining off or distilling off the ethylene and butene 50 grams of ethylene was again pressed on to the contact left in the autoclave and heated to 109° C. for 10½ hours. The treatment resulted in the recovery of 13 grams of ethylene and 16.4 grams of butene. This corresponds to a conversion of 74% of the ethylene introduced, but only a formation of 45.5% of the converted ethylene in butene. In another test carried out with the same contact remaining in the autoclave 30% of the converted ethylene was in the form of butene.

The polymerized ethylene obtained each time not in the form of butene can easily be isolated out of the autoclave residue in the form of a mixture of hexene, octene and higher ethylene polymers. This rapid drop in the efficiency of the activator can, it is true, be compensated by adding further quantities of nickel salts, particularly nickel acetylacetonate. However, the phenomenon is extremely disturbing especially for the production of butene from ethylene in continuous experiments of long duration. Moreover the necessity of repeatedly adding fresh nickel means an increase in the consumption of aluminum trialkyl of which a certain percentage is always lost in the reduction of the added nickel salt.

It has now been found that the efficiency of the activator can be maintained almost indefinitely if the polymerization of the ethylene is carried out in the presence of acetylene hydrocarbons. An acetylene content in the ethylene of 0.2 to 1% is already sufficient to prolong considerably the efficiency of the aluminum trialkyl nickel catalyst. A similar effect can be attained also if in a cycle of experiments such as that above described the catalyst, after acting on the ethylene, is brought into contact with acetylene for a short time in the cold. Compounds which contain the —C≡CH— group act in a similar manner to acetylene, for example, methylacetylene, hexine, phenylacetylene, diacetylene, vinylacetylene. The effect of such additions is explained by the following comparative test.

4. Three experiments were carried out exactly like that above described. However, the autoclave was exhausted after draining off the excess ethylene and the butylene which had formed, then acetylene was allowed to flow in and shaken for 1 minute, about 250 cc. of acetylene being thereby absorbed. The three experiments now yielded in butene 89%, 92% and 86% of the ethylene actually converted. The degrees of conversion of the ethylene were between 60 and 80%.

Particularly effective catalysts for the dimerization of ethylene to form butene are obtained if nickel acetylacetonate is mixed in the presence of an excess of acetylene with aluminum triethyl. A particularly effective catalyst can be produced in the following manner:

5. 3 grams of nickel acetylacetone are dissolved in 200 cc. of xylol, mixed with 51 cc. of phenylacetylene and then 300 cc. of aluminum triethyl are carefully allowed to drip thereinto while cooling and stirring.

This mixture is particularly suitable for continuous production of butene from ethylene in continuous operation during which it is possible to work at any desired pressures, but between 5 and 100 atmospheres is particularly advantageous. The space-time yield at 40 atms. ethylene pressure and a test temperature of 120° C. amounts to about 500 cc. of liquid butene/liter contact/hour for the catalyst described.

The exceptionally favorable effect of the catalyst containing phenylacetylene is explained by the following discontinuous experiment:

6. 17 cc. of the catalyst mixture described in Example 5, were made up to 50 cc. under nitrogen with xylol and mixed with ethylene in a 200 cc. autoclave and subsequently heated to a temperature of 110 to 115° C. for about 3 hours. The mixture was then allowed to cool and the light volatile fractions were isolated, heating the autoclave to 60° C. The experiment was then repeated with the residue remaining in the autoclave. The quantity of ethylene pressed on from time to time was 25 to 40 grams and the degree of conversion of the ethylene in the individual experiments 63 to 90%. The experiment was repeated 13 times and gave butene yields of at least 95%, and frequently 100%. The weight of the residue remaining in the autoclave did not however increase, so that certainly no higher ethylene polymers were formed. The experiment was finally interrupted although it could certainly have been carried on much longer.

The advantageous effect of the addition of phenylacetylene is also shown by the following continuous experiment.

7. In a pressure-resisting tube 1 meter in length an insert was introduced having 120 to 130 trays which ensured a content of 250 to 300 cc. of liquid. This reactor was heated to 110° C. and placed under 40 atms. ethylene pressure which was maintained during the entire process. The catalyst described in Example 5, composed of nickel acetylacetonate, phenylacetylene and aluminum triethyl was injected at the upper end of the reactor tube. Instead of xylol, however, benzene was used for dissolving the nickel acetylacetone which was subsequently again separated off over a small column in vacuum.

The catalyst is injected at a speed of 200 to 300 cc./hr. At the lower end of the reactor a liquid phase, catalyst: butene=2:1, is expanded so that no sump forms in the furnace, which is easily recognizable by the speed of the stream of unchanged ethylene which should be kept as small as possible. The expanded gases flow through a trap cooled to —80° C. in which the butene condenses, whereas the unchanged ethylene passes on and frees small quantities of hexene and is again injected into the reactor. The apparatus delivers hourly approximately 100 to 150 cc. of liquid butene, besides small quantities of hexene. If the ethylene contains no impurities, such as oxygen, moisture and carbon dioxide, the catalyst remains effective almost indefinitely.

Effects similar to those obtained with phenylacetylene can also be obtained with methylacetylene, hexine, vinylacetylene and diacetylene, which leads to the conclusion that all compounds with the —C≡CH group show the same favorable effect.

When carrying out such experiments it is obviously necessary to use an ethylene which contains no impurities which irreversibly destroy the aluminum triethyl. Such substances are particularly oxygen, moisture and carbon dioxide. If such impurities are present, it is evident that the entire activity, that is the quantity of the ethylene converted per unit of time, will drop in the course of such a long cycle of experiments, but this can be compensated for by heating for a longer period. The nature of the reaction products, however, does not change. Even if such impurities are present, the experiments produce butene, and preferably α-butene as practically the sole product of reaction.

Analogous results can also be obtained with mixtures of cobalt or platinum salts with aluminum trialkyls.

It was likewise found that considerably better results can be attained if the growth and displacement reactions are carried out separately and no activators are used in the growth reaction. Under these circumstances it is possible to start with a certain compound having the basic formula $AlR_1R_2R_3$ (wherein $R_1$, $R_2$, $R_3$ can represent similar or dissimilar alkyls) and to build this up first by means of $n$ molecules of ethylene without the addition of activators according to equation 5 to a compound having the general formula

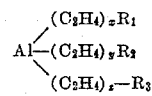

(wherein $x+y+z=n$). It is then possible, by a suitable choice of the quantity of ethylene used, to adjust the average molecular weight of the residue combined with the aluminum to any desired extent. If the activator, for example nickel, is then first added and the ethylene again allowed to act, no further development of the residue bound on the aluminum takes place but the residues bound on the aluminum are displaced according to the equation 6 at a great speed by the action of the ethylene in the form of α-olefins having the general formula $$CH_2=CH-(C_2H_4)_{x-1}R_1$$
$$CH_2=CH-(C_2H_4)_{y-1}R_2$$
$$CH_2=CH-(C_2H_4)_{z-1}R_3$$

wherein again $x+y+z=n$, that is equal to the number of mols used per mol of the original aluminum compound, and the residues $R_1$, $R_2$, $R_3$ represent alkyls which may be similar or dissimilar. In addition aluminum triethyl is formed. The reaction product in the second phase is thus a mixture of α-olefins and aluminum triethyl which also contains the nickel added as activator.

Fundamentally it might be supposed that by repeating the application of ethylene higher aluminum alkyls can again be produced and that the whole process can be repeated as often as desired. This procedure alone is, however, not practicable because this mixture with additional ethylene would produce preferably butene, seeing that the reaction of the ethylene with the aluminum triethyl must now take place in the presence of the nickel. Therefore, if it is desired to use afresh the aluminum triethyl reformed according to Formula 6 it will be necessary first to free from activators the entire reaction product obtained, which can be most easily effected by distillation. This distillation must, however, be carried out at the lowest possible temperatures because there is a danger that—now in the absence of excess ethylene—the α-olefins of the reaction mixture reverse the reaction and liberate ethylene from the aluminum ethyl, thereby reforming higher molecular aluminum trialkyls. It has been found namely, that, although ethylene quite obviously has a preferential tendency to bind on the aluminum in the form of ethyl groups so that already a slight excess of ethylene is sufficient for the procedure illustrated by the Formula 6 but at the same time the conversion illustrated by Formula 6 is fundamentally reversible. Therefore if the work is carried out under conditions under which the ethylene can escape from the system, the reaction will be reversed. The danger of this reversal is, however, very slight as long as the reaction mixtures containing activators are not heated to a temperature above about 100° C. As the boiling point of the aluminum triethyl in a vacuum is considerably lower than 100° C., the separation of the aluminum triethyl from the reaction mixtures containing nickel presents no difficulties. When the nickel has been separated, the recovered aluminum triethyl can safely be reintroduced into the process and as a result any quantities of α-olefinic polymerization products of ethylene of any desired adjustable average molecular size can be produced from a certain quantity of aluminum triethyl.

In the displacement phase according to the process forming the subject matter of the invention, which phase has just been described, very short reaction times are sufficient when the activator, preferably consisting of colloidal nickel, has sufficient activity. Such highly active nickel catalysts are obtained, for example, according to Example 5 by adding drop by drop a solution or suspension of nickel acetylacetone in, for example, benzene to aluminum triethyl or the higher aluminum trialkyls built up in the first phase with ethylene. Very small quantities of colloidal nickel—0.01% colloidally dissolved nickel is sufficient—are enough to bring about the complete process of displacement at an ethylene pressure of 100 atms. already at room temperature within 15 minutes. If the temperature is raised to between 50 and 70° C. much lower ethylene pressures are sufficient and nevertheless the displacement takes place in the course of a few minutes.

For carrying out the process in practice it is evident that such short times and such a smooth course of displacement offer great advantages but such highly active activators also lead to difficulty. It is known from literature that finely divided metals, particularly nickel, are capable of catalysing a rearrangement of the double bond in olefinic hydrocarbons; therefore the olefinic reaction products when highly active activators are used, always contain olefins with intermediate double bond in varying quantities, depending upon the temperature maintained during the displacement and the total duration of the reaction. Thus, by experiments carried out at temperatures above 70° C. and with a total heating period of about 1 hour, it has been possible to show up to 20% of olefins with intermediate double bond in the reaction product obtained. If reaction products of this kind are required, this can obviously be exploited and by suitably prolonging the reaction period or adding greater quantities of nickel to the reaction mixture, the reaction product can to a great extent be converted into such olefins with intermediate double bond. These olefins are moreover absolutely straight chained and contain no branch chain admixtures.

However, for most presently foreseeable purposes of use, pure α-olefinic reaction products are by far the most valuable, for which reason, it is a preferred practice of the invention to obtain the highest possible percentage yield of α-olefins. This can be attained in various ways, for example by maintaining the lowest possible temperature (below 50° C.) in the displacement phase, by using as little as possible of the highly active colloidal nickel—it is possible to reduce this to less than 0.001%—and also by employing special operational measures and carrying out the whole process taking care that the contact duration of the reaction products with the nickel activator remains only so short that if it is just sufficiently long to attain the desired object of as far as possible a complete displacement. However, the desired results can also be achieved by other means, for example by modifying the effect of the nickel activator by the addition of a small quantity of acetylene compound as already described. For this purpose any acetylene compound, or acetylene itself can be used. Phenylacetylene is a typical and convenient material for this purpose.

The effectiveness of the nickel catalysts in the course of the second (displacement) phase of the process according to the invention is clearly reduced by the addition of such acetylene compounds; for example, no displacement whatever took place at room temperature with 0.001% colloidal nickel in a reaction mixture according to the invention, when 1 vol. percent phenylacetylene was added, that is, there was no longer any olefin formation and it was necessary to increase the temperature to 50–70° C. at 100 atms. ethylene pressure to allow the displacement to take place. On the other hand, however, the reaction products obtained remained absolutely pure α-olefins, even in the case of longer heating periods in the displacement phase. The quantity of the acetylene added, as compared with that indicated, can be reduced considerably. The influence of the phenylacetylene is obviously a question of a specific contamination of the nickel catalyst only as regards its isomerizing effect. For the displacement reaction, the contamination is not nearly as strong, even if it can be proved. In summarizing the following may be said:

The best method hitherto known for the smooth conversion of ethylene into α-olefinic ethylene polymers of the desired average molecular size and of pure olefinic character, is the combination of the following measures:

1. Combining aluminum triethyls with ethylene to form higher aluminum alkyls according to German Patent 878,560.

2. Treatment of the resultant addition product with ethylene in the presence of nickel and acetylene compounds in small quantities.

3. Distillation of the product of reaction thus obtained at the lowest possible temperatures, whereby the nickel remains as residue.

4. Re-employment of the aluminum triethyl left over for commencing a new cycle of reaction.

The nature of the process according to the invention has, for the sake of simplicity, been explained with the aid of a particular method of carrying it into effect, namely the polymerization of ethylene to form higher olefins, using nickel in colloidal form. Firstly, it is obvious that the nickel or metals with an effect equivalent thereto, might be used in some other suitable form. Particularly for a continuous operation, activators firmly bound on carriers are advantageous, for example, nickel, cobalt or platinum deposited on granular aluminum.

Such arrangements offer the great advantage that the phases 2+3 mentioned above in the summary, need no longer be carried out separately, but with the aid of activators firmly bonded on carriers it is easily possible to attain that, in the displacement phase, a solution of aluminum triethyl in α-olefins free from activator runs off at the lower end of a reaction tower, which solution can be used again without previous distillation or after only partly separating the olefins from the aluminum triethyl. In this case it is evident that the aluminum triethyl continually becomes diluted with the α-olefinic products of reaction during the process and it is consequently necessary in any case to introduce a distillation from time to time. This distillation, however, need not by any means be carried out in each individual cycle but only now and then. The use of firmly bonded surface catalysts also presents another advantage, namely that the aluminum trialkyl contained in the reaction mixture can easily be separated from very many ethylene polymers by distillation, that is from those which have lower or higher boiling points. Olefins with say 10 to 12 carbon atoms have, however, a boiling point which lies very near that of aluminum ethyl so that the separation of these olefins in particular from the aluminum ethyl is extremely difficult. Now nickel catalysts arranged on firm surfaces have been used, so the nickel-free reaction product obtained can first be built up again with ethylene into higher molecular aluminum compounds and from these also the olefins with 10 to 12 carbon atoms in particular can very easily be distilled out in very pure state, that is, merely by changing the sequence of the three processes: building up, distillation and displacement, the separation of the olefins with 10 to 12 carbon atoms is greatly facilitated. It sometimes happens with such experiments with solid nickel contacts that some of the nickel goes into solution and the products of reaction from the upper parts of the reaction towers do not run off entirely free from nickel; this can interfere with the reaction. In these instances another aid has proven very effective, namely the addition of small quantities of a suitable iron salt, such as anhydrous ferrochloride or ferroacetylacetonate, to the reaction products. Some iron then forms in colloidal state and this surrounds the slight traces of colloidal nickel and renders it inactive. The iron has no particular effect on the reactions herein described.

Apart from such changes in the purely technical application of the process according to the invention, it is evident that changes can also be made as regards the raw materials used.

We claim:

1. In the process for the polymerization of ethylene into polymers ranging from butene to solid polymers averaging about $C_{30}$ using aluminum trialkyls as catalysts, the improvement which comprises effecting the polymerization by contacting the ethylene at a temperature ranging between about 50 and 250° C. with an aluminum trialkyl catalyst activated with a metal selected from the group consisting of nickel, cobalt, and platinum.

2. Improvement according to claim 1, in which said aluminum trialkyl is an aluminum trialkyl having three identical alkyl radicals.

3. Improvement according to claim 1, in which said aluminum trialkyl is aluminum triethyl.

4. Improvement according to claim 1, in which said aluminum trialkyl has three different alkyl radicals.

5. Improvement according to claim 1, in which said group metal is in finely divided form.

6. Improvement according to claim 1, in which the activated catalyst is produced by adding a salt of a metal of said group to the aluminum trialkyl.

7. Improvement according to claim 1, in which said contacting is effected at a temperature between about 80 and 120° C.

8. Improvement according to claim 1, in which said contacting is effected under a pressure of between about 5 and 100 atmospheres.

9. Improvement according to claim 1, in which said contacting is effected in the presence of .02—1% of an acetylenic hydrocarbon based on the ethylene.

10. Improvement according to claim 9, which includes effecting said contacting until a notable decrease in the activity of the catalyst occurs, and thereafter contacting the catalyst with an acetylenic hydrocarbon while cooling.

11. Improvement according to claim 1, in which said contacting is effected in the presence of an acetylenic hydrocarbon and in which the activated catalyst is formed by contacting the aluminum trialkyl with a compound of a metal of said group in the presence of an acetylenic hydrocarbon.

12. Improvement according to claim 1, in which said contacting is effected in the presence of an acetylenic hydrocarbon and in which said ethylene is substantially free from contaminants including oxygen, water, and carbon dioxide.

13. In the process for the polymerization of ethylene into polymers ranging from butene to solid polymers averaging about $C_{30}$, the improvement which comprises contacting a polyethylene trialkyl aluminum addition compound, obtained by contacting ethylene with an aluminum trialkyl at a temperature between about 60° and 120° C. to thereby obtain a polyethylene component for such compound averaging about $C_6$ to $C_{30}$, with ethylene at a temperature between about 50 and 250° C. in the presence of an activator selected from the group consisting of nickel, cobalt, and platinum to thereby split off ethylene polymer from said higher weight aluminum compound, and recovering the polymer formed.

14. Process according to claim 13, in which the entire reaction product from the splitting reaction is freed from the activator by distillation at a temperature below 100° C.

15. Process according to claim 13, in which the splitting off contacting is effected at a temperature of about 50° C.

16. Process according to claim 13, in which said activator is present in amount of less than 0.01%, and in which the polymer recovered consists substantially of α-olefins.

17. Process according to claim 13, in which said contacting in the presence of the activator is effected for a period of time sufficient to form α-olefins and insufficient to form olefins having an intermediate double bond.

18. Process according to claim 13, in which said splitting off contacting is effected in the presence of an acetylenic hydrocarbon.

19. Process according to claim 13, in which said splitting off contacting is effected at a temperature in excess of 70° C.

20. Process according to claim 13, in which said splitting off contacting is effected in the presence of an amount of activator exceeding 0.001%, and in which the split off polymers include substantial quantities of olefins having an intermediate double bond.

21. Process according to claim 13, in which said splitting off contacting in the presence of the activators is effected for a period of time sufficient to produce a substantial quantity of olefins having an intermediate double bond.

22. Process according to claim 13, in which said activator is present on a carrier material.

23. Process according to claim 22, in which said carrier material is granulated aluminum.

24. Process for the polymerization of ethylene into polymers ranging from butene to solid polymers averaging about $C_{30}$, which comprises contacting ethylene with an aluminum trialkyl at a temperature between about 60 and 120° C., to thereby add the ethylene to the aluminum trialkyl forming a higher-molecular weight aluminum compound, introducing the aluminum compound formed into a vertical reaction zone containing an activator selected from the group consisting of nickel, cobalt, and platinum on a carrier, introducing ethylene into the lower portion of the reaction zone, maintaining the reaction zone at a temperature of about 50–250° C., withdrawing aluminum triethyl in α-olefins free from said activator from the lower portion of said reaction zone and recycling the withdrawn aluminum triethyl with at least a portion of the α-olefins for further addition reaction with ethylene.

25. Process according to claim 24, in which at least a portion of the α-olefins are separated from the withdrawn product prior to the recycling.

26. Process according to claim 24, which includes adding an iron salt to the withdrawn product prior to the recycling.

27. Process according to claim 24, in which a portion of the α-olefins is removed by distillation from the withdrawn product, the withdrawn product thereafter contacted with ethylene at a temperature between about 60 and 120° C. to convert the aluminum triethyl to higher molecular weight aluminum compounds, and thereafter distilling off olefins having between 10 and 12 carbon atoms from these compounds.

References Cited in the file of this patent

UNITED STATES PATENTS 2,210,148   Indest ------------------ Aug. 6, 1940

FOREIGN PATENTS 504,161   Belgium --------------- July 14, 1951